United States Patent
Bodvarsson et al.

(10) Patent No.: US 10,992,130 B2
(45) Date of Patent: Apr. 27, 2021

(54) HEAD-WORN DEVICE HAVING ELECTROSTATIC DISCHARGE PROTECTION

(71) Applicant: WIDEX A/S, Lynge (DK)

(72) Inventors: Thorvaldur Oli Bodvarsson, Copenhagen S (IS); Michael Frydendal Larssen, Vekso (DK)

(73) Assignee: Widex A/S, Lynge (DK)

( * ) Notice: Subject to any disclaimer, the term of this patent is extended or adjusted under 35 U.S.C. 154(b) by 229 days.

(21) Appl. No.: 16/124,509

(22) Filed: Sep. 7, 2018

(65) Prior Publication Data

US 2019/0074688 A1    Mar. 7, 2019

Related U.S. Application Data

(60) Provisional application No. 62/555,288, filed on Sep. 7, 2017.

(51) Int. Cl.
| | |
|---|---|
| *H02H 9/06* | (2006.01) |
| *H04R 25/00* | (2006.01) |
| *H01T 4/08* | (2006.01) |

(52) U.S. Cl.
CPC .............. *H02H 9/06* (2013.01); *H01T 4/08* (2013.01); *H04R 25/00* (2013.01); *H04R 25/65* (2013.01); *H04R 2225/025* (2013.01); *H04R 2225/49* (2013.01)

(58) Field of Classification Search
CPC ............. H02H 9/06; H01T 4/08; H04R 25/00
See application file for complete search history.

(56) References Cited

U.S. PATENT DOCUMENTS

| | | | | |
|---|---|---|---|---|
| 5,621,602 | A | * | 4/1997 | Winkelmann ....... H01H 85/048 337/184 |
| 6,207,912 | B1 | | 3/2001 | Persson |
| 6,865,279 | B2 | * | 3/2005 | Leedom ................ H04R 25/60 381/322 |

(Continued)

FOREIGN PATENT DOCUMENTS

| | | |
|---|---|---|
| EP | 0 305 213 A2 | 3/1989 |
| EP | 2 671 391 B1 | 12/2013 |

(Continued)

OTHER PUBLICATIONS

"3M Low Static Polyimide Film Tape 7419," Technical Data, Aug. 2014, pp. 1-3.

(Continued)

*Primary Examiner* — Scott Bauer
(74) *Attorney, Agent, or Firm* — Sughrue Mion, PLLC

(57) ABSTRACT

A head-worn device comprises a housing with an insulating housing wall and is housing a conducting element (24; 31) having at least one end embedded into the housing wall, and a component (22; 30) being arranged adjacent to the conducting element (24; 31). The component (22; 30) and the conducting element (24; 31) are being separated by a partitioning element (26; 28; 40) provided as an insulator. The partitioning element (26; 28; 40) is having a shape increasing the travelling distance for a spark between the conducting element (24; 31) and the component (22; 30) by at least 40%, and a thickness and a Dielectric Strength sufficient to resist 3 kV without breaking down.

9 Claims, 3 Drawing Sheets

(56) References Cited

U.S. PATENT DOCUMENTS

| | | | |
|---|---|---|---|
| 7,369,388 B2 | 5/2008 | Cheung et al. | |
| 7,625,237 B2 * | 12/2009 | Hackenbuchner | H05B 41/02 |
| | | | 439/620.02 |
| 8,933,337 B2 * | 1/2015 | Payan | H01R 39/50 |
| | | | 174/137 B |
| 2007/0154042 A1 | 7/2007 | Buckley et al. | |
| 2013/0308787 A1 | 11/2013 | Stanley et al. | |
| 2014/0270191 A1 | 9/2014 | Nikles | |
| 2016/0044836 A1 * | 2/2016 | Miller | H05K 7/1471 |
| | | | 361/740 |

FOREIGN PATENT DOCUMENTS

| | | |
|---|---|---|
| EP | 2 782 363 A1 | 9/2014 |
| WO | WO 01/69971 A2 | 9/2001 |

OTHER PUBLICATIONS

Dupont Kapton—Summary of Properties, Jan. 1, 2017 (Jan. 1, 2017), XP055477337, http://www.dupont.com/content/dam/dupont/products-and-services/membranes-and-films/polyimde-films/documents/Dec-Kapton-summary-of-properties.pdf s.

European Search Report, dated Sep. 28, 2019, Application EP 18 19 1053.

* cited by examiner

HEAD-WORN DEVICE HAVING ELECTROSTATIC DISCHARGE PROTECTION

BACKGROUND OF THE INVENTION

The present invention relates to head-worn devices, such as hearing aids. The invention, more particularly, relates to a method of providing electrostatic discharge protection for head-worn device.

Spark gaps are spaced apart electrodes having a breakdown voltage dependent on the electrode spacing and geometry. When a voltage across the gap spacing exceeds the breakdown voltage, an arc is created across the spark gap that causes the voltage across the spark gap to clamp to a clamp level. The International Electrotechnical Commission requires that a hearing aid must be immune against 8 kV (contact) and 15 kV (air) in an electrostatic discharge (ESD level 4 of the standard) test (IEC61000-4-2).

The electrostatic discharge may damage sensitive electrical components in the hearing aid. Therefor hearing aids need to be ESD protected.

Electrostatic Discharge is a transient discharge of static charge between two objects at different electrostatic potentials either through direct contact or an induced electric field. It is the result of a static charged object. Charge on the surface of any material generally is neutral, but when energy is imparted to an object, a charge imbalance occurs.

Conductors can't be charged easily through friction due to the mobility of the electrons in the conducting surface as charge recombination takes place and preserves the neutral surface. On the other hand, insulators can be easily charged by friction. Imparting energy to non-conducting material, e.g. a plastic surface, results in a large local buildup charge until it is discharged via an external path. The voltage levels generated by electrostatic charging can exceed several kilovolts.

Due to the compact geometry of hearing aids, the purpose of the invention is to protect sensitive components from damaging sparks caused by e.g. tribocharging. When a conducting element one end embedded in the housing wall, it may potentially carry an electrostatic charge being damaging for sensitive components.

SUMMARY OF THE INVENTION

This purpose is according to the invention achieved by a head-worn device according to claim 1. The partitioning element, e.g. an ESD protecting foil, when properly designed extends the travelling distance for a spark significantly, and thereby reduces the risk for that air breaks down between the two components.

Preferably, the ESD protecting foil or dielectric foil is a polyimide film having a thickness and a Dielectric Strength permitting the dielectric foil to be able to resist 3 kV, or even better 5 kV, without breaking down. In one embodiment, the dielectric foil has a thickness at 25 µm and a dielectric strength of approximately 300 V/µm.

In one embodiment, the component carrying block includes a rib element to which the dielectric foil is adhered, e.g. by gluing or welding (e.g. ultrasonic welding).

In one embodiment, the dielectric foil is arranged between the two component having respective tips defining the shortest distance between the components (electrodes), wherein the dielectric foil is arranged with a line connecting the tips passing through the dielectric foil, and with the dielectric foil being placed perpendicular to the line connecting the tips and equidistant to the tips.

According to a second aspect of the invention there is provided a method of providing electrostatic discharge protection for head-worn device, wherein the method during the manufacturing of the head-worn device includes mounting two components adjacent to each other on a component carrying block and arranging a dielectric foil in between the two components. The partitioning element is having a shape increasing the travelling distance for a spark between the electrostatically chargeable element and the component by at least 40%, and a thickness and a Dielectric Strength sufficient to resist 3 kV without breaking down.

A third aspect of the invention provides use of a dielectric foil in between two components mounted adjacent to each other on a component carrying block for electrostatic discharge protection of a head-worn device.

BRIEF DESCRIPTION OF THE INVENTION

The invention will be described in further detail with reference to preferred aspects and the accompanying drawing, in which.

DETAILED DESCRIPTION

Figure 1:
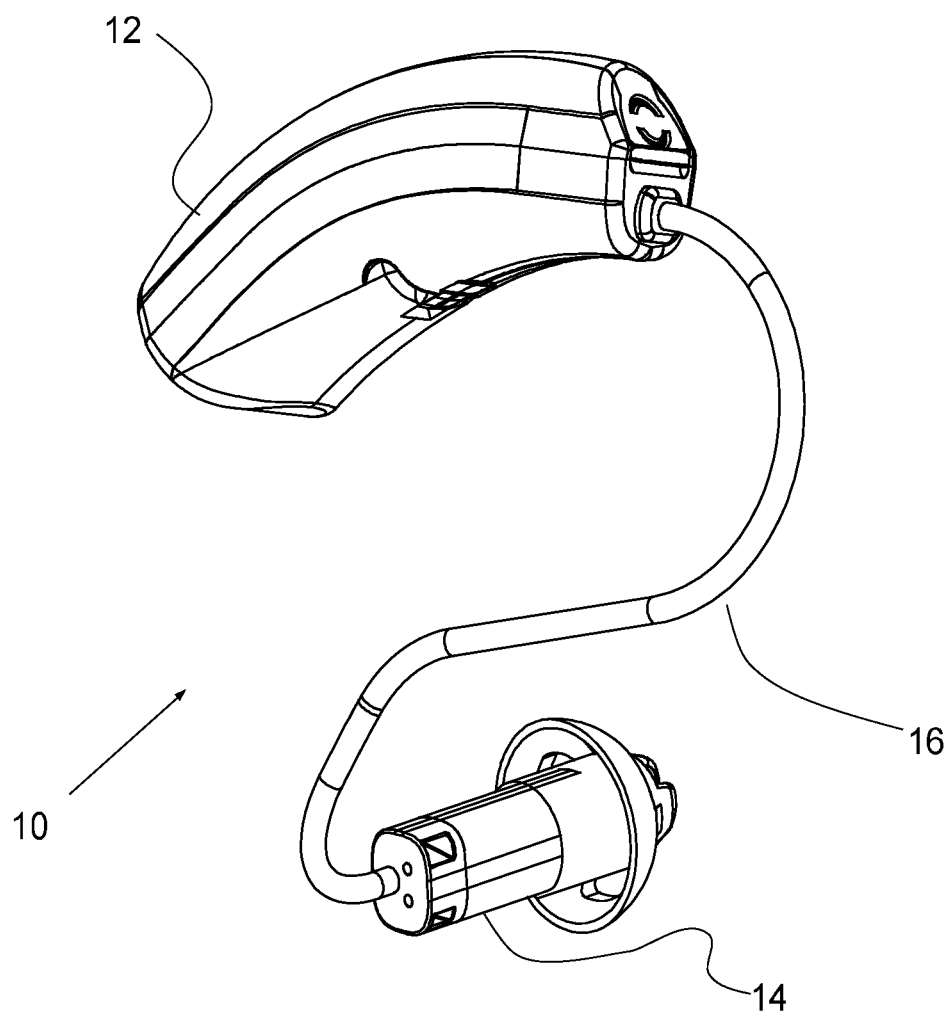
FIG. 1 illustrates schematically a head-worn device according to one embodiment of the invention.

A head-worn device is according to one embodiment of the invention a hearing aid 10 as shown in FIG. 1. The hearing aid 10 comprises a Behind-The-Ear (BTE) housing component 12, to which there is attached a Receiver-In-The-Ear (RITE) component 14. The major part of the electronics (including some microphones, a processor, a battery and preferably a short-range radio, e.g. Bluetooth based, and an inductive radio) of the hearing aid 10 is located inside of the BTE housing component 12. The sound producing parts of the hearing aid 10 (including a speaker) are located inside of the RITE component 14. The BTE housing component 12 and the RITE component 14 are interconnected by a cable 16 comprising two or more wires (not shown) for transferring audio processed in the BTE housing component 12 to the speaker in the RITE component 14, for powering components in the RITE component 14, and/or for transferring audio picked up by a microphone (not shown) in the RITE component 14 to the audio processing components in the BTE housing component 12.

Figure 2:
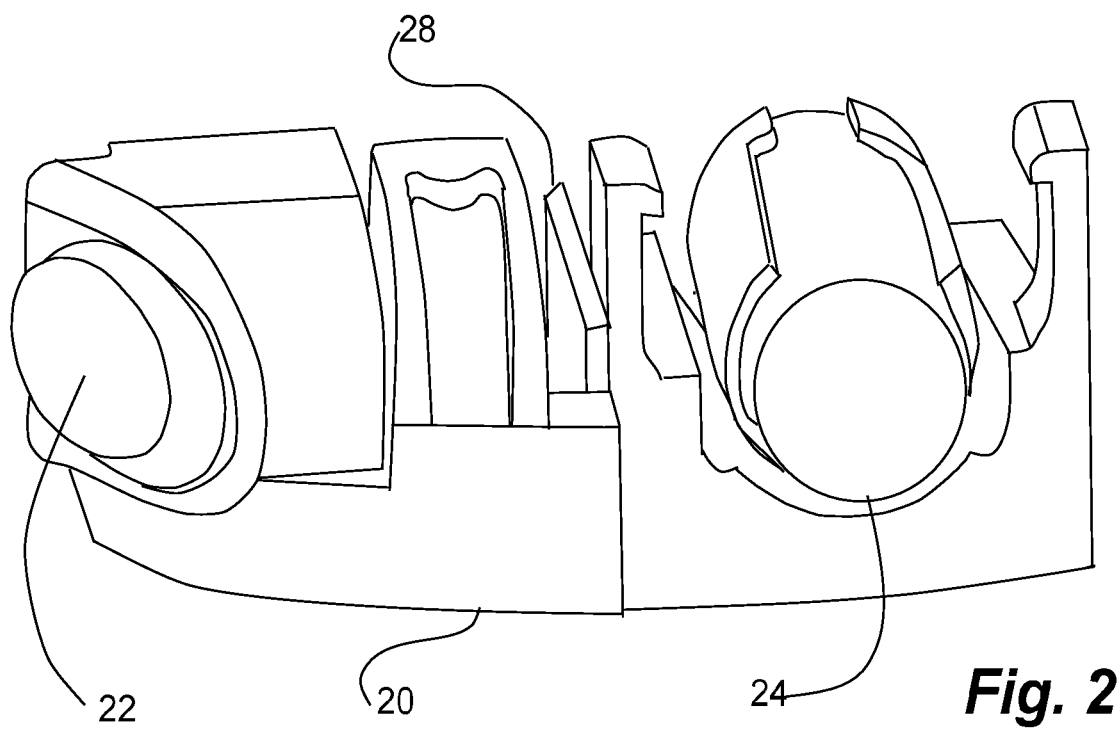
FIGS. 2 and 3 shows a section of a component carrying block according to one embodiment of the invention.
Figure 3:
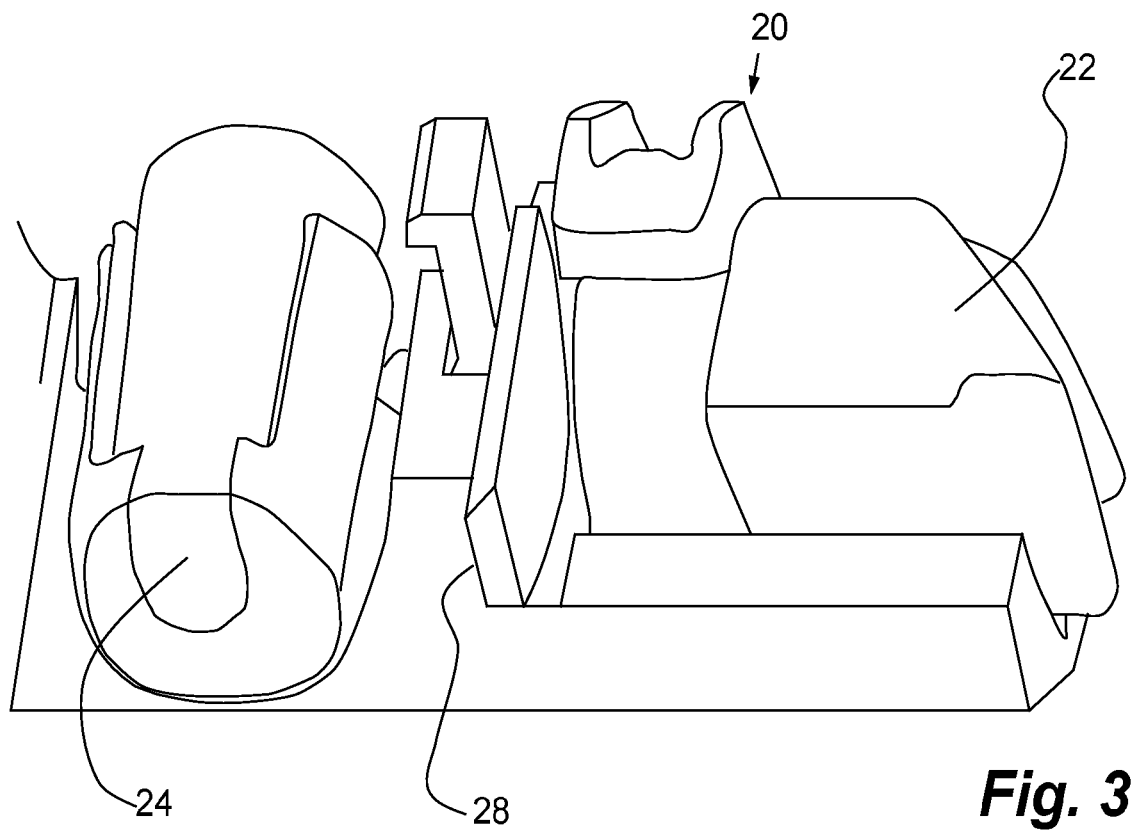

As section of a component carrying block 20 is shown in FIGS. 2 and 3. The component carrying block 20 is contained in the BTE housing component 12 shown in FIG. 1, and carries one or more components. The components may be selected from the group of components including the microphones, the processor, or integrated radio circuits for the short-range radio or the inductive radio. On the section of the component carrying block 20 is shown in FIGS. 2 and 3, there is mounted a microphone component 22 and a coil component 24 for an inductive radio. The microphone component 22 and a coil component 24 are of design constraints provided adjacent to each other, and in between the microphone component 22 and the coil component 24, there is provided a wall element 28. Preferably, the wall element 28 is integral with the component carrying block 20. In one embodiment, the component carrying block 20 with the wall element 28 is manufactured by injection moulding of e.g. a thermoplastic material or a thermosetting polymer.

The invention relates to a head-worn device comprising the component 30 and a conducting element 31 that may carry an electrostatic charge arranged adjacent to each other. This is illustrated schematically in FIG. 4. The parts defining the shortest distance defined by tips 33 and 34 of the component 30 and the conducting element 31 carrying an electrostatic charge defines a gap 32. When high voltage is applied to the gap, an electric arc (or a spark) may be formed between the tips 33 and 34. Air breaks down at about 30 kV/cm, depending on e.g. humidity and temperature. Then the voltage across the gap 32 drops, and the arc behaves almost as a short circuit, drawing as much current as the electrical power supply can deliver, and the heavy load dramatically reduces the voltage across the gap. The gab 32 may be filled with air and (not shown) the thermoplastic material or the thermosetting polymer of the component carrying block 20. Therefor the electric arc may or spark may travel slightly longer along a non-straight line.

Electrostatic discharge (ESD) is the sudden flow of electricity between two electrically charged objects caused by contact, an electrical short, or dielectric breakdown. A buildup of static electricity can be caused by tribocharging (contact electrification process that build-up static electricity due to touching or rubbing of certain surfaces) or by electrostatic induction. The ESD occurs when differently-charged objects are brought close together or when the dielectric between them breaks down, often creating a visible spark.

Figure 4:
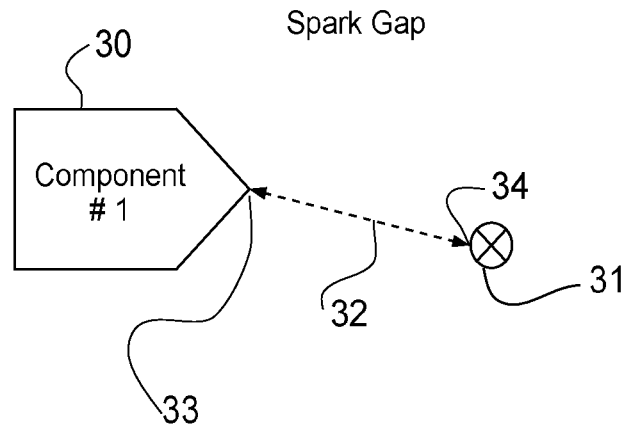
FIG. 4 illustrates a component and a conducting element arranged adjacent to each other.
Figure 5:
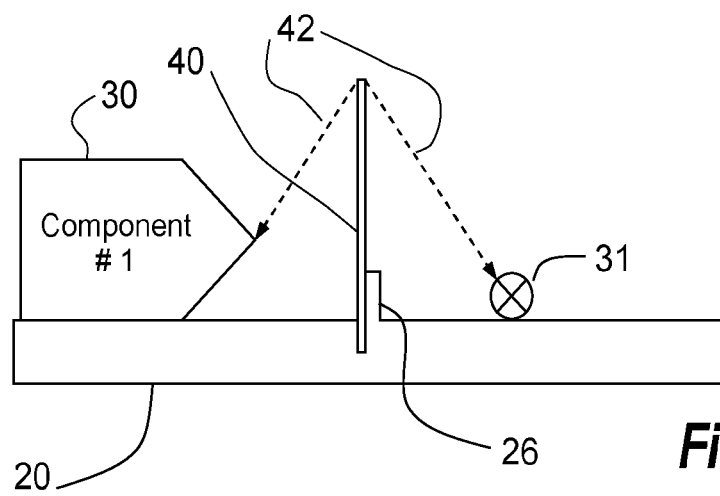
FIG. 5 illustrates a component and a conducting element arranged adjacent to each other with an ESD protecting foil arranged in between according to a second embodiment of the invention.

Turning to FIG. 5, the component 30 and the conducting element 31 carrying an electrostatic charge, as shown in FIG. 4, are mounted on the component carrying block 20 with the rib element 26. An ESD protecting foil 40 is provided in an electrically-insulating material and arranged in between the component 30 and the conducting element 31 carrying an electrostatic charge. Preferably, the ESD protecting foil 40 is adhered to the rib element 26. In one embodiment, the ESD protecting foil 40 is glued to the rib element 26. In another embodiment, the ESD protecting foil 40 is welded (e.g. by ultrasonic welding) to the rib element 26. The ESD protecting foil 40 when properly designed extends the travelling distance 42 for a spark significantly, and thereby reduces the risk for that air breaks down between the tips 33 and 34 (electrodes).

Figure 6:
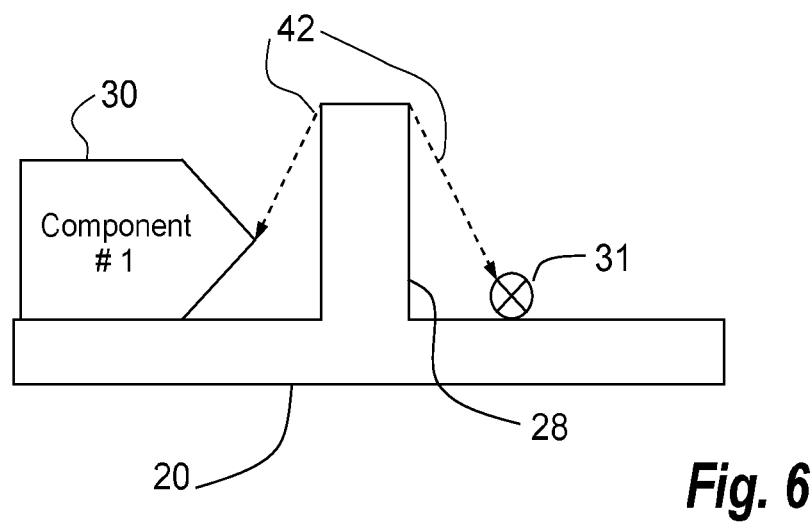
FIG. 6 illustrates a component and a conducting element arranged adjacent to each other with a wall element arranged in between according to a third embodiment of the invention.

FIG. 6 illustrates how the component 30 and the conducting element 31 carrying an electrostatic charge are mounted on the component carrying block 20 and separated by a wall element 28. The wall element 28 is provided integrally with the component carrying block 20 and arranged in between the component 30 and the conducting element 31 carrying an electrostatic charge. The wall element 28, when properly designed, extends the travelling distance 42 for a spark significantly, and thereby reduces the risk for that air breaks down between the tips 33 and 34 (electrodes). The wall element 28 need to have a thickness of at least a quarter to a half mm to ensure that the material does not breaks down due to an electrostatic potential of e.g. 5 kV across the wall element 28.

In an ideal design with the ESD protecting foil 40 being disc-shaped with a radius, R, with the line connecting the tips 33 and 34 passing through the center of the disc, and with the disc being equidistant from the tips 33 and 34, the travelling distance for a spark will be increased by 40% when the radius, R, is half the distance between the tips 33 and 34, and by 120% when the radius, R, corresponds to the distance between the tips 33 and 34.

The tip 33 of the component 30 and tip 34 the conducting element 31 carrying an electrostatic charge will often be metallic or conductive parts. For an embodiment where the component 30 is embodied as a microphone, the tip 33 may be the litz-wire used in electronics to carry an alternating current generated by the microphone.

Damage to a body-worn device by the ESD event is determined by the device's ability to dissipate the energy of the discharge or withstand the current levels involved. This is known as device "ESD sensitivity" or "ESD susceptibility". Some devices may be prone to damage from handling by the user. One of the major challenge in dealing with hearing devices is the users requests small and compact device. This bring components close together which raised the risk for ESD events. By just adding dielectric material into the device will increase the weight of the device, and this will adversely affect the comfort for the end user, and furthermore reduce the durability of the device is dropped.

The electric circuits may incorporate appropriate ESD protection components as e.g. diodes and filters for protecting sensitive component, and according to the invention the ESD protecting foil 40 protects against the generation of electric arcs or sparks between. Using a thin foil instead of a thicker wall will save weight.

An ESD protecting foil 40 is preferably manufactured in a non-fibrous and flexible material as a foil. The ESD protecting foil 40 may have a thickness up to a quarter of a millimeter (0.25 mm). Preferably ESD protecting foil 40 is even thinner.

A foil suitable for use as the ESD protecting foil 40 must be thin, preferably below 125 µm or lower. In one further embodiment, the ESD protecting foil 40 has thickness of 75 µm. In one further embodiment, the ESD protecting foil 40 has thickness in the range of 25 µm.

It is important that the ESD protecting foil 40 has superior dielectric characteristics, such as a dielectric strength of 100 V/µm permitting a thin foil to be able to resist at least e.g. 5 kV without breaking down. In one embodiment, a 25 µm Kapton® foil has a dielectric strength is approximately 300 V/µm, and in one further embodiment, a 50 µm Kapton® foil has a dielectric strength is approximately 240 V/µm.

The ESD protecting foil 40 may in one embodiment be a polyimide film, e.g. Kapton® developed by DuPont. Kapton® is a registered trademark of DuPont™. Kapton® remains stable across the temperature range required according to the invention which is substantially included in the range from 0 to +50° C. Kapton® polyimide film may be used in a variety of electrical and electronic insulation applications. Many of these applications are based on the excellent balance of electrical, thermal, mechanical, physical, and chemical properties.

The chemical name for Kapton® Type HN is poly (4,4'-oxydiphenylene-pyromellitimide), and it is produced from the condensation of pyromellitic dianhydride and 4,4'-oxydiphenylamine. Kapton® Type HN film can be laminated, metallized, punched, formed, or adhesive coated, and Kapton® Type HN is available as e.g. 25 µm, 50 µm, 75 µm, and 125 µm films.

Kapton® Type HPP-ST has all of the properties of Type HN, plus superior dimensional stability and modified surface for better adhesion. Type HPP-ST is available as 12.5 µm, 25 µm, 50 µm, 75 µm, and 125 µm films. These values in table 1 are measured at 23° C. and 50% relative humidity.

TABLE 1

Electrical Properties of Kapton ® Type HN and HPP-ST Films
Electrical Properties of Kapton ® Type HN and HPP-ST Films

| Thickness | Dielectric Strength [V/µm] | Dielectric Constant | Dissipation Factor | Volume Resistivity [Ωm] |
|---|---|---|---|---|
| 25 µm | 303 | 3.4 | 0.0018 | $1.5 \times 10^{15}$ |
| 50 µm | 240 | 3.4 | 0.0020 | $1.5 \times 10^{15}$ |
| 75 µm | 205 | 3.5 | 0.0020 | $1.4 \times 10^{15}$ |
| 125 µm | 154 | 3.5 | 0.0026 | $1.0 \times 10^{15}$ |

The electrical properties of Kapton® polyimide film depends on the humidity, and the parameters for a 25 µm film appears from table 2. However, a Kapton® polyimide film have excellent room temperature electrical properties for use in a hearing aid 10 or another head-worn device.

The term "dielectric strength" means for an insulating material, the maximum electric field that a pure material can withstand under ideal conditions without breaking down (i.e., without experiencing failure of its insulating properties). The 25 µm Kapton® layer will be able to resist almost 7.5 kV without breaking down, whereby the protecting foil extends the travelling distance for a spark significantly, and thereby reduces the risk for that air breaks down between the two components and causes an electrostatic discharge. Even with a very high humidity (100%), the Kapton® layer will be able to resist almost 6.7 kV without breaking down.

TABLE 2

Relative Humidity vs. Electrical Properties of Kapton ® Type HN Film, 25 µm
Relative Humidity vs. Electrical Properties of Kapton ® Type HN Film, 25 µm

| Relative Humidity, % | Dielectric Strength [V/µm] | Dielectric Constant | Dissipation Factor |
|---|---|---|---|
| 0 | 339 | 3.0 | 0.0015 |
| 30 | 315 | 3.3 | 0.0017 |
| 50 | 309 | 3.5 | 0.0020 |
| 80 | 280 | 3.7 | 0.0027 |
| 100 | 268 | 3.8 | 0.0035 |

The superior mechanical stability of Kapton® Type HN is important when handling and mounting the ESD protecting foil 40 on the rib element 26 of component carrying block 20. The ESD protecting foil 40 adhered to the rib element 26 may have a thickness of 25 µm and have side length of 4 mm.

When two components according to the present invention are arranged adjacent to each other, this means that the components do have a relative distance permitting the build-up of an electrostatic potential across the gap spacing exceeding the breakdown voltage in air. The Dielectric Strength for air is approximately 1.5-3 V/µm depending on humidity. This means that a breakdown voltage of 5 kV will occur when the distance is below 1.7-3.3 mm.

An electrical insulator is a material in which electric charges do not flow freely. Under normal conditions, only a negligible electric current will pass through under influence of an electric field. A dielectric material is an electrical insulator that can be polarized by an applied electric field. When the dielectric material is placed in an electric field, electric charges do not pass through the material as for an electrical conductor.

Most plastics have a dielectric strength in the range of 10 to 30 V/µm with an average around 20 V/µm. Therefore, Kaplan® will have dielectric strength being 10-15 times higher than plastics in general.

An electrical insulator is a material in which electric charges do not flow freely. Under normal conditions, only a negligible electric current will pass through under influence of an electric field.

Insulators may be easily charged by static electricity. The BTE housing component 12 of the hearing aid 10 is often manufactured by a plastic material. Therefore, a static electric charge can be created on the outer surface of the BTE housing component 12. Due to the insulating plastic material, the static electric charge will stay for a while, unless a conducting element is able to transport the charge. The conducting element 31 carrying an electrostatic charge is such a conducting element being able to bring the static electric charge from the outer surface of the BTE housing component 12 towards the electronic components inside the BTE housing component 12. The conducting element 31 carrying an electrostatic charge may e.g. be a steel pin used in the hearing aid's battery drawer as hinge. The conducting element 31 carrying an electrostatic charge may also be an antenna element embedded in the walls of the BTE housing component 12. However, such antenna elements will be electrically connected to the radio, and electric circuit components protecting the radio may be integrated in the signal path. The conducting element 31 carrying an electrostatic charge may also be sweat depositions (containing salt) piling up in dividing lines along housing parts of the BTE housing component 12.

However, other types of dielectric foils having superior dielectric or isolating characteristics for very thin layers may be applied. The dielectric foil shall furthermore have a sufficient rigidity so it can be handled during the assembling of e.g. a hearing device, and can maintain the shape during the lifetime of the hearing device. It should be noted that the above description of preferred embodiments is merely an example, and that the skilled person would know that numerous variations are possible without departing from the scope of the claims.

The invention claimed is:

1. A head-worn device comprising a housing with an insulating housing wall and is housing:
   a conducting element having at least one end embedded into the housing wall, and
   a component being arranged adjacent to the conducting element,
   wherein the component and the conducting element being separated by a partitioning element provided as an insulator, and
   wherein the partitioning element is having a shape increasing the travelling distance for a spark between the conducting element and the component by at least 40%, and a thickness and a Dielectric Strength sufficient to resist 3 kV without breaking down.

2. The head-worn device according to claim 1 wherein the partitioning element is a dielectric foil manufactured as a polyimide film.

3. The head-worn device according to claim 2 wherein the dielectric foil has a thickness and a Dielectric Strength permitting the dielectric foil to be able to resist 5 kV without breaking down.

4. The head-worn device according to claim 3 wherein the dielectric foil has a thickness at 25 μm and a dielectric strength of approximately 300 V/μm.

5. The head-worn device according to claim 1, wherein the at least one component is mounted on a component carrying block, and wherein the partitioning element is provided as a wall element integral with the component carrying block.

6. The head-worn device according to claim 2, wherein at least one component is mounted on a component carrying block, wherein a rib element is provided integrally with the component carrying block, and wherein the dielectric foil is glued or welded to the rib element.

7. The head-worn device according to claim 1, wherein the partitioning element is arranged between the at least one component and the conducting element carrying an electrostatic charge each having respective tips defining the shortest distance between the at least one component and the conducting element carrying an electrostatic charge, wherein the partitioning element is arranged with a line connecting the tips passing through the partitioning element, and with the partitioning element being placed perpendicular to the line connecting the tips and equidistant to the tips.

8. A method of providing electrostatic discharge protection for head-worn device, and during the manufacturing of the head-worn device including:
  mounting a component and an electrostatically chargeable element adjacent to each other on a component carrying block;
  arranging a partitioning element in between the component and the electrostatically chargeable element; and
  wherein the partitioning element is having a shape increasing the travelling distance for a spark between the electrostatically chargeable element and the component by at least 40%, and a thickness and a Dielectric Strength sufficient to resist 3 kV without breaking down.

9. The method according to claim 8, wherein the at least one component and the electrostatically chargeable element having respective tips defining the shortest distance between the at least one component and the electrostatically chargeable element, and further including arranging the partitioning element with a line connecting the tips passing through the partitioning element, and with the partitioning element being placed perpendicular to the line connecting the tips and equidistant to the tips.

* * * * *